(12) United States Patent
Major et al.

(10) Patent No.: US 8,215,902 B2
(45) Date of Patent: Jul. 10, 2012

(54) SCALABLE HIGH PRESSURE COMPRESSOR VARIABLE VANE ACTUATION ARM

(75) Inventors: Daniel W. Major, Middletown, CT (US); Bernard W. Pudvah, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 790 days.

(21) Appl. No.: 12/251,560

(22) Filed: Oct. 15, 2008

(65) Prior Publication Data

US 2010/0092278 A1    Apr. 15, 2010

(51) Int. Cl.
 *F01D 17/12*  (2006.01)
(52) U.S. Cl. ............... 415/161; 415/208.2; 29/889.22
(58) Field of Classification Search .......... 415/148, 415/150–165; 29/889.22, 889.02, 889.2, 29/889.24
See application file for complete search history.

(56) References Cited

U.S. PATENT DOCUMENTS

| | | | |
|---|---|---|---|
| 4,767,264 A * | 8/1988 | Kisling et al. ............... 415/156 |
| 4,773,821 A | 9/1988 | Gonthier et al. | |
| 4,808,069 A | 2/1989 | Bonner et al. | |
| 4,826,399 A | 5/1989 | Perez | |
| 4,990,056 A | 2/1991 | McClain et al. | |
| 5,211,537 A | 5/1993 | Langston et al. | |
| 5,308,226 A | 5/1994 | Venkatasubbu et al. | |
| 5,492,446 A | 2/1996 | Hawkins et al. | |
| 5,593,275 A | 1/1997 | Venkatasubbu et al. | |
| 5,622,473 A | 4/1997 | Payling | |
| 5,807,072 A | 9/1998 | Payling | |
| 6,146,093 A * | 11/2000 | Lammas et al. ............... 415/160 |
| 6,413,043 B1 | 7/2002 | Bouyer | |
| 6,481,960 B2 | 11/2002 | Bowen | |
| 6,808,364 B2 | 10/2004 | O'Reilly et al. | |
| 6,884,025 B2 * | 4/2005 | Pickens et al. ............... 415/160 |
| 6,895,947 B2 * | 5/2005 | Allmang et al. ............. 123/559.3 |
| 6,984,104 B2 * | 1/2006 | Alexander et al. ............ 415/159 |
| 7,011,494 B2 * | 3/2006 | Kies et al. ..................... 415/148 |
| 7,094,022 B2 | 8/2006 | Bruce | |
| 7,104,754 B2 | 9/2006 | Willshee et al. | |
| 7,140,838 B2 * | 11/2006 | Raulin et al. ................. 415/159 |
| 7,163,369 B2 | 1/2007 | Bruce | |
| 7,182,571 B2 * | 2/2007 | Selby ............................ 415/156 |
| 7,207,770 B2 | 4/2007 | Bruce | |
| 7,214,030 B2 | 5/2007 | Arilla et al. | |
| 7,220,098 B2 | 5/2007 | Bruce et al. | |
| 7,223,066 B2 * | 5/2007 | Rockley ........................ 415/160 |

FOREIGN PATENT DOCUMENTS

| | | | |
|---|---|---|---|
| GB | 757230 | * | 9/1956 |
| GB | 2399865 | * | 9/2004 |
| SU | 450896 | * | 12/1974 |

* cited by examiner

*Primary Examiner* — Steven Loke
*Assistant Examiner* — Victoria Hall
(74) *Attorney, Agent, or Firm* — Kinney & Lange, P.A.

(57) ABSTRACT

A variable vane arm has a hook portion comprising a radially inner leg connected to a radially outer leg by an arcuate connection, and an actuation lever extending from the hook portion. The hook portion and actuation lever are formed from a singular piece of material.

9 Claims, 8 Drawing Sheets

SCALABLE HIGH PRESSURE COMPRESSOR VARIABLE VANE ACTUATION ARM

BACKGROUND

Gas turbine engines are widely applied machines for generating power or thrust. Most typically, they are employed on modern aircraft to provide the propulsion necessary for flight. They may also be used onboard such aircraft for power generation in an APU (Auxiliary Power Unit) capacity to provide for onboard heating, cooling, and ventilation, as well as operational power and lighting systems onboard the aircraft within the cockpit, passenger cabin, and the like. They may also be used in land based applications for generation of electrical power or mechanical horsepower in myriad vehicles and pieces of machinery.

In a typical gas turbine engine, three main sections are provided, namely, a compressor section, a combustion section, and a turbine section. Within the compressor section, ambient air is ingested, highly compressed, and directed through a downstream diffuser into the combustion section. Within the combustion section, the highly compressed air is mixed with fuel within an annular combustion chamber and burned at extremely high temperatures, generating massive levels of heat energy. Moreover, as opposed to internal combustion engines, wherein the ignition of the fuel is intermittent every two or four strokes of the engine, ignition within a gas turbine engine is continuous, thereby increasing the high power levels attainable by the engine.

From the combustion section, the extremely hot combustion gases are directed to the turbine section downstream of the combustion chamber. As both the turbine section and the compressor section are mounted on the same shaft assembly, rotation of the turbine blades, upon contact with the rapidly expanding and hot combustion gases, causes the shaft to which they are mounted to rotate and in turn causes the compressor blades, also mounted to the shaft, to rotate and thus complete the engine cycle. There can be additional turbine stages which are separately attached to shafts that spin fan blades or generators. The discharge of the rapidly expanding hot gases at high velocities from the turbine causes the engine to generate the aforementioned thrust needed for aircraft operation.

Typical compressors and turbines include a plurality of blades mounted on the rotor or central shaft of the engine, and a plurality of vanes on an inner engine casing, sometimes referred to as a stator. Within the compressor section, the compression ratio achievable by modern day gas turbine engines is in excess of 40:1. Such compressors can also rotate in excess of 1,000 miles/hr. and ingest in excess of 2,600 lbs/air/sec. These attributes, when combined with the continuous flow and ignition of fuel indicated above, can result in the engine generating in excess of 250,000 hp, with exhaust gases exiting the engine at speeds in excess of 1,000 miles/hr, thereby enabling commercial aircraft to cruise at the slightly less than supersonic speeds at which modern travelers have become accustomed, and military aircraft to travel at Mach speeds necessary in modern warfare.

However, in order for such engines to operate optimally, the vanes of the compressor section, those extending the engine casing, must be accurately dimensioned and mounted to ensure the incoming air is compressed as needed and does not simply flow axially through the engine. Moreover, it is often necessary for some vanes to be movable about a longitudinal axis. More specifically, such vanes are typically provided with a mounting stem or trunnion for connection to a vane arm. The vane arm is mounted so as to be rotatable and is connected to an actuator, such as a motor or other power source within the aircraft, so as to enable the vanes to rotate when the vane arm rotates.

In light of the above, one of ordinary skill in the art will readily understand that the mounting structure of the vane arm must be sufficiently robust to withstand the significant forces generated by the compressor section during not only normal operation, but when the engine experiences surge or other transients as well.

With prior art vane designs, vanes are typically mounted within vane arms using a retention device often referred to as a claw. In other words, the vane arm includes first and second appendages which wrap around the vane trunnion and insert into grooves or slots provided within the vane trunnion. A threaded fastener such as a bolt is then inserted through the vane arm and into the vane trunnion to provide additional attachment. Such a design provides a dual retention feature in that the claws are able to retain the vane in the event that the preload provided by the fastener is lost or when the entire fastener itself becomes dislodged from the vane arm. However, such a design is limited in the load conditions under which it can operate in that the claw arms tend to spread or cam away from the trunnion under high loads thereby causing the assembly to lose its capability for driving the vane to the correct angular orientation.

In another prior art design, it has therefore been known to provide a vane arm that drives the vane using an interference fit between the trunnion and the vane arm, with a loose fit being provided between another portion of the trunnion and a surge slot of the vane arm. Accordingly, when the vane arm assembly is placed under high loads and the interference fit begins to be lost due to deformation of the vane arm, the deformation causes the loose fitting area between the vane arm and trunnion to tighten, thereby providing a secondary mechanism for driving the vane under higher loads. While such a design is effective in this regard, it does not provide dual retention features in the event of fastener or fastener preload loss, and it requires relatively heavy materials at added expense.

It is also known in the prior art to provide a vane arm that has a dual retention capability to ensure that vanes of the gas turbine engine remain connected to the vane arm even under surge loads or when the fastener is lost. This is accomplished with a variable vane arm with a surge slot to facilitate rotation of the vane even when the vane is operating under surge or otherwise excessively high pressure conditions. Such a system and design is effective for dual retention, but does again require relatively heavy materials and added expense in manufacturing.

Within the context of aircraft, it is also important to understand that weight is always at a premium. The lighter the material is, the lighter the engine, and the lighter the engine, the lighter the aircraft will be. This directly translates into less fuel consumption and lower costs of operation. Designers have therefore been required to select materials which are sufficiently robust to withstand the aforementioned loads, while minimizing the weight being added to the aircraft. A still further complicating factor is that of cost. Quite often the materials which are sufficiently robust to withstand the loads encountered by the engine and still meet certain weight requirements, come at costs which make them unacceptable. Alternatively, they come at a cost which makes the overall engine cost more than is desirable.

In light of the foregoing, it can therefore be seen that a need exists for a vane arm mounting structure with improved retention capabilities even in the situation where fastener preload or the entire fastener are lost, and which can provide a mechanism by which the vane can be driven during both normal loads and surging. Moreover, it would be beneficial if such a design were to be provided wherein relatively inexpensive and light weight materials could be used in the place of materials which have traditionally been required.

SUMMARY

In one embodiment, a variable vane arm has a hook portion comprising a radially inner leg connected to a radially outer leg by an arcuate connection, and an actuation lever extending from the hook portion. The hook portion and actuation lever are formed from a singular piece of material.

In another embodiment, a vane arm assembly is disclosed that contains a vane arm having a hook portion having a radially inner leg connected to a radially outer leg by an arcuate connection and an actuation lever extending from the hook portion. A spacer capable of being inserted into the hook portion of the vane arm, a locking mechanism attached to the radially outer side of the hook, and a fastener for securing the assembly to a vane are also provided to complete the assembly.

In a different embodiment, a gas turbine engine has a compressor section, a combustion section; and a turbine section. The compressor section contains a plurality of vanes connected to a plurality of vane arms, each vane arm having a hook portion having a radially inner leg connected to a radially outer leg by an arcuate connection, and an actuation lever extending from the hook portion.

In yet another embodiment, a method of fabricating a vane arm is disclosed. A blank is cut from a sheet of material, and then bent in a first position to create a hook portion with two generally parallel legs. A fixture designed to be placed between the two generally parallel legs to support the vane arm during additional fabrication is provided. Then, a first aperture through a first generally parallel leg, and a second aperture through the second generally parallel leg are machined in the vane arm. The first aperture and the second aperture are collinear about a common axis.

DETAILED DESCRIPTION

Figure 1:
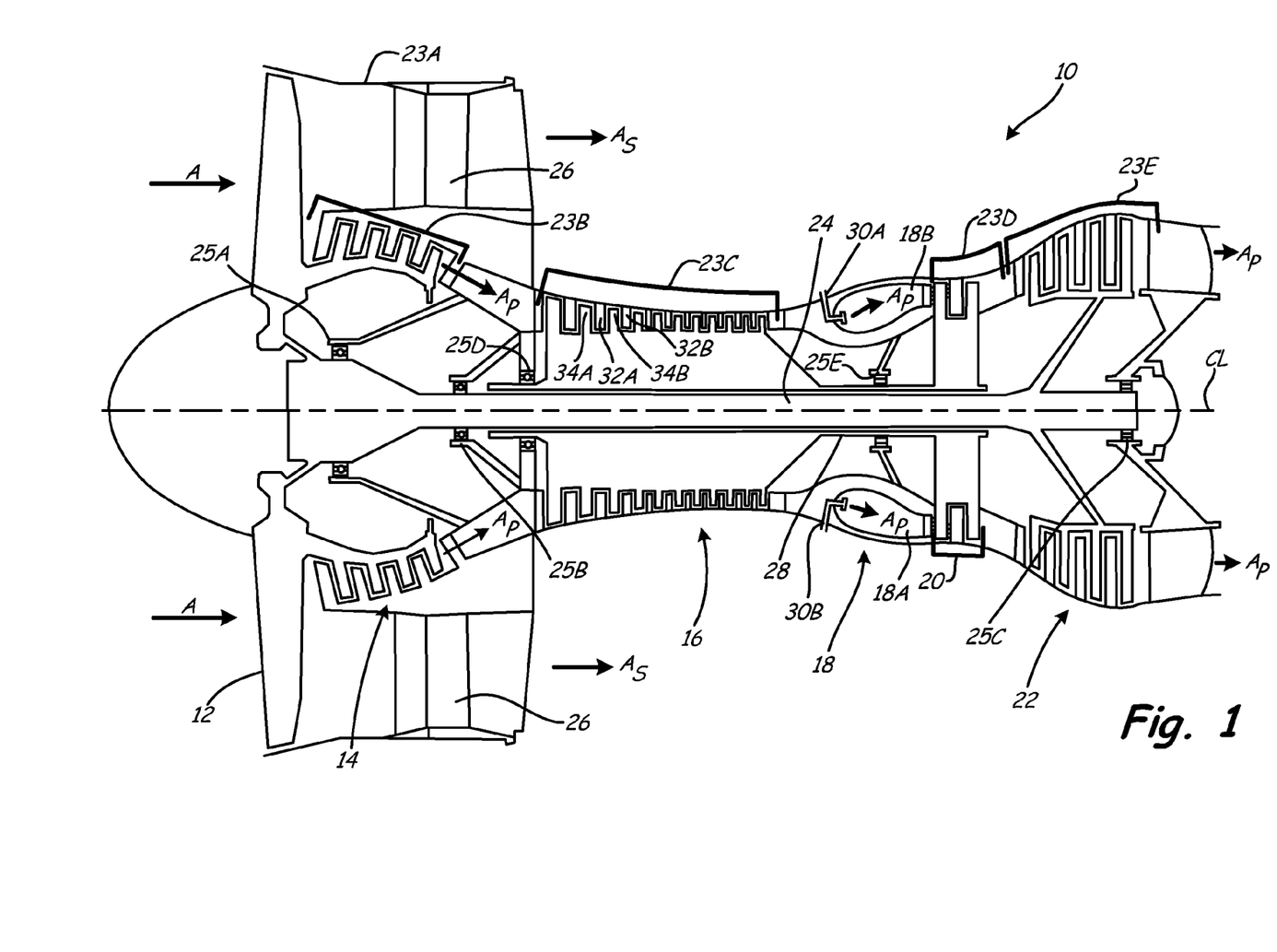
FIG. 1 shows a schematic of a gas turbine engine in which variable vane arm assemblies are used.

FIG. 1 shows a schematic engine 10, which is a gas turbine engine in which a vane segment with an integral inner air seal can be used. Engine 10 comprises fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E such that an air flow path is formed around centerline CL.

Inlet air A enters engine 10 and it is divided into streams of primary air AP and secondary air AS after it passes through fan 12. Fan 12 is rotated by low pressure turbine 22 through shaft 24 to accelerate secondary air AS (also known as bypass air) through exit guide vanes 26, thereby producing a major portion of the thrust output of engine 10. Shaft 24 is supported within engine 10 at bearings 25A, 25B and 25C. Primary air AP (also known as gas path air) is directed first into low pressure compressor (LPC) 14 and then into high pressure compressor (HPC) 16. LPC 14 and HPC 16 work together to incrementally step up the pressure of primary air AP. HPC 16 is rotated by HPT 20 through shaft 28 to provide compressed air to combustor section 18. Shaft 28 is supported within engine 10 at bearing 25D and bearing 25E. The compressed air is delivered to combustors 18A and 18B, along with fuel through injectors 30A and 30B, such that a combustion process can be carried out to produce the high energy gases necessary to turn turbines 20 and 22. Primary air AP continues through gas turbine engine 10 whereby it is typically passed through an exhaust nozzle to further produce thrust.

In order to expand the performance range of engine 10, variable stator vanes are used in high pressure compressor 16. For example, HPC 16 comprises variable vanes 32A and 32B, which are stationary and extend radially inward from HPC case 23C. Blades 34A and 34B, which rotate with HPC 16 on shaft 28, are positioned adjacent vanes 32A and 32B. Vanes 32A and 32B form part of an array of vane stages arranged circumferentially around the engine centerline between HPC case 23C and an inner diameter vane shroud. Blades 34A and 34B sequentially push primary air AP past vanes 32A and 32B within HPC 16 to increase the pressure of primary air AP. Vanes 32A and 32B rotate about their radial axis to adjust the incidence of the air AP onto subsequent blades, including blade 34B, during different operation modes, or speeds, of engine 10. In order to ensure optimal operation of engine 10, it is preferable that vanes 32A and 32B are able to rotate freely about their axis within HPC case 23C and the inner diameter vane shroud.

Figure 2:
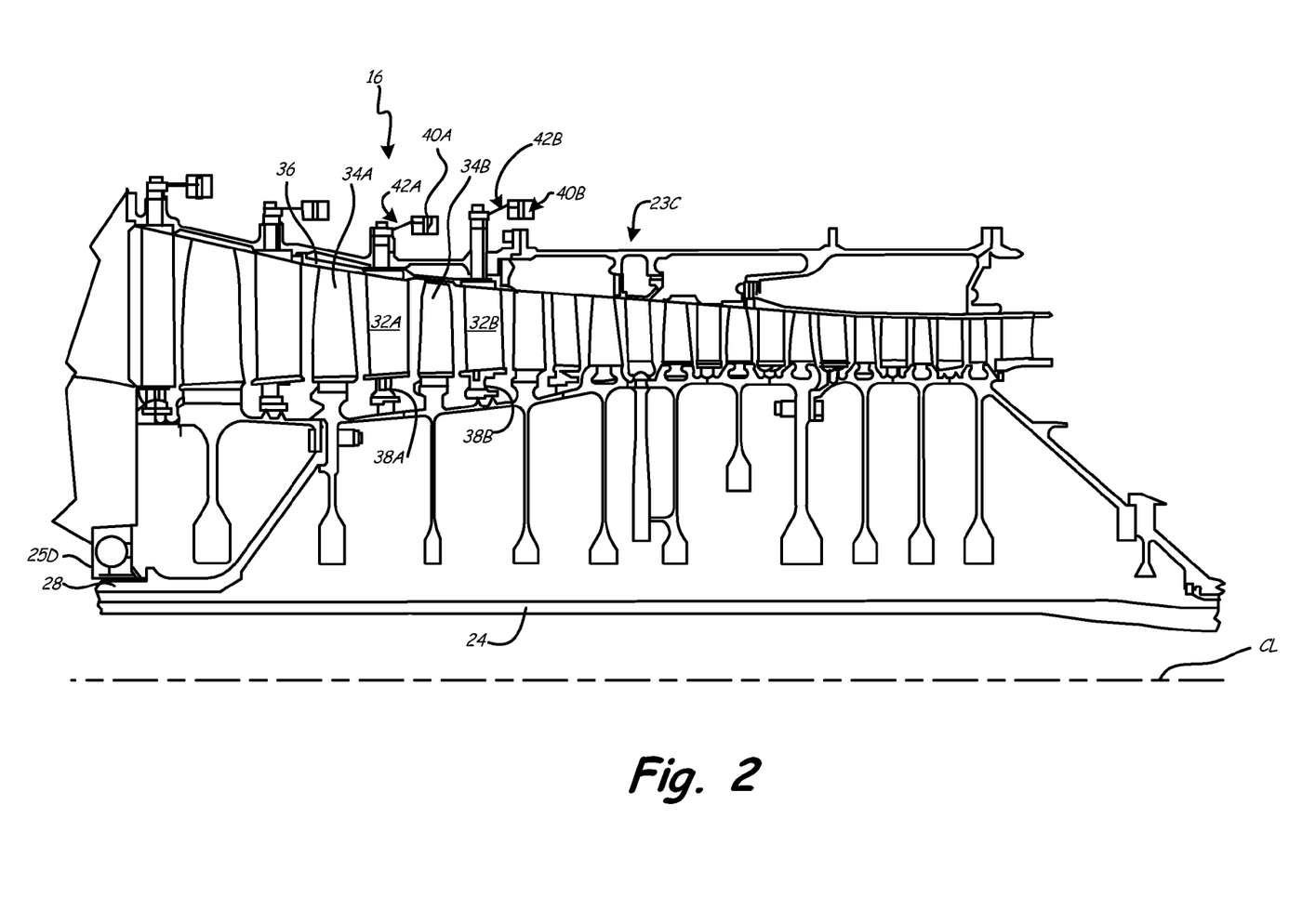
FIG. 2 shows a high pressure compressor section of the gas turbine engine of FIG. 1 showing the interaction between variable stator vanes and a high pressure compressor (HPC) front case.

FIG. 2 shows the sequential arrangement of the various stages of high pressure compressor 16 about centerline CL of gas turbine engine 10. A stage namely consists of a circular row of vanes immediately followed by a row of blades or vice versa. Thus, a given stage has a stationary set of airfoils followed by a rotational set of airfoils—or vice versa. For the embodiment of engine 10 shown, HPC 16 is divided into stages S5 through S15, with LPC 14 of FIG. 1 comprising stages S1 through S4. Vanes 32A and 32B and blades 34A and 34B comprise stages S6 and S7 of HPC 16, respectively. The variable vanes rotate between HPC case 23C and a plurality of inner diameter vane shrouds. Specifically, vanes 32A and 32B rotate between HPC outer shroud 36, which is a component of HPC case 23C, and HPC inner shrouds 38A and 38B, respectively. In order to rotate vanes 32A, 32B within outer shroud 36, vanes 32A, 32B are connected to synchronization rings 40A and 40B, respectively, through a plurality of vane arms 42A, 42B. Synchronization rings 40A, 40B are connected to, for example, a hydraulic actuator to adjust the pitch of vanes 32A, 32B such that airflow through HPC 16 is optimized for different operating levels of engine 10. In order that vanes 32A, 32B rotate freely within outer shroud 36 and inner shrouds 38A, 38B, vanes 32A, 32B include inner and outer diameter trunnions.

When rotation of one of vanes 32A, 32B is desired, corresponding vane arm 42A, 42B to which the particular vane 32A, 32B is mounted is rotated. To provide the motive force needed for such rotation each vane arm 42A, 42B is connected to an actuator. Energization of the actuator causes movement of a linkage or similar structure, which in turn causes movement of synchronization ring 40A, 40B extending circumferentially around the engine casing 23C. As each vane arm 42A, 42B is pivotally connected to synchronization ring 40A, 40B, movement of synchronization rings 40A, 40B causes movement of vane arms 42A, 42B, and thus vanes 32A, 32B. Any number of different actuators and drive mechanisms may be employed, including, but not limited to, motors, gears, pulleys, linear actuators, solenoids, screwdrives, and the like. In addition, a number of synchronization rings (as represented by 40A, 40B) corresponding to the number of vane stages may be provided, with two rings and stages being depicted in FIG. 2.

Figure 3:
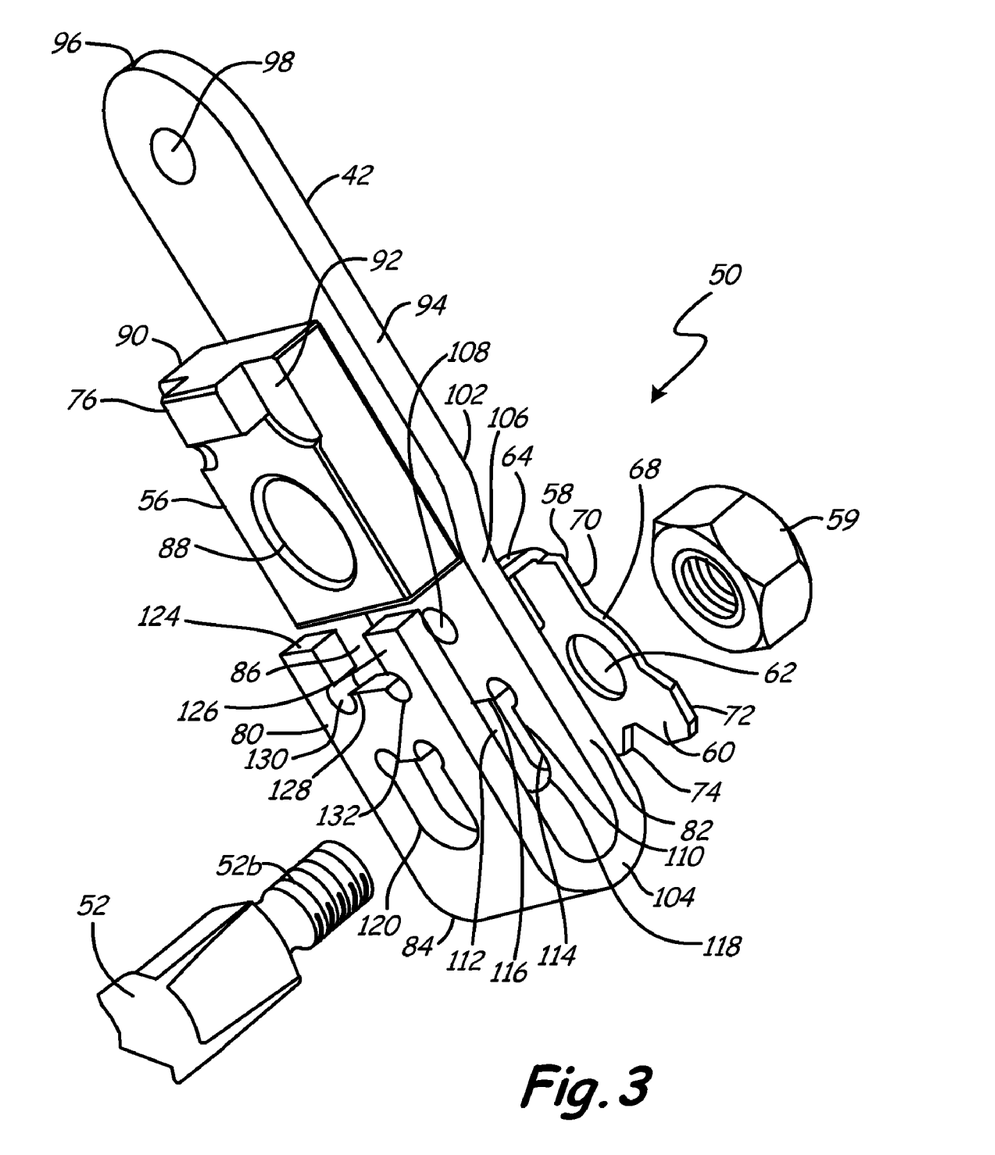
FIG. 3 shows a perspective view of a variable vane arm assembly.
Figure 4:
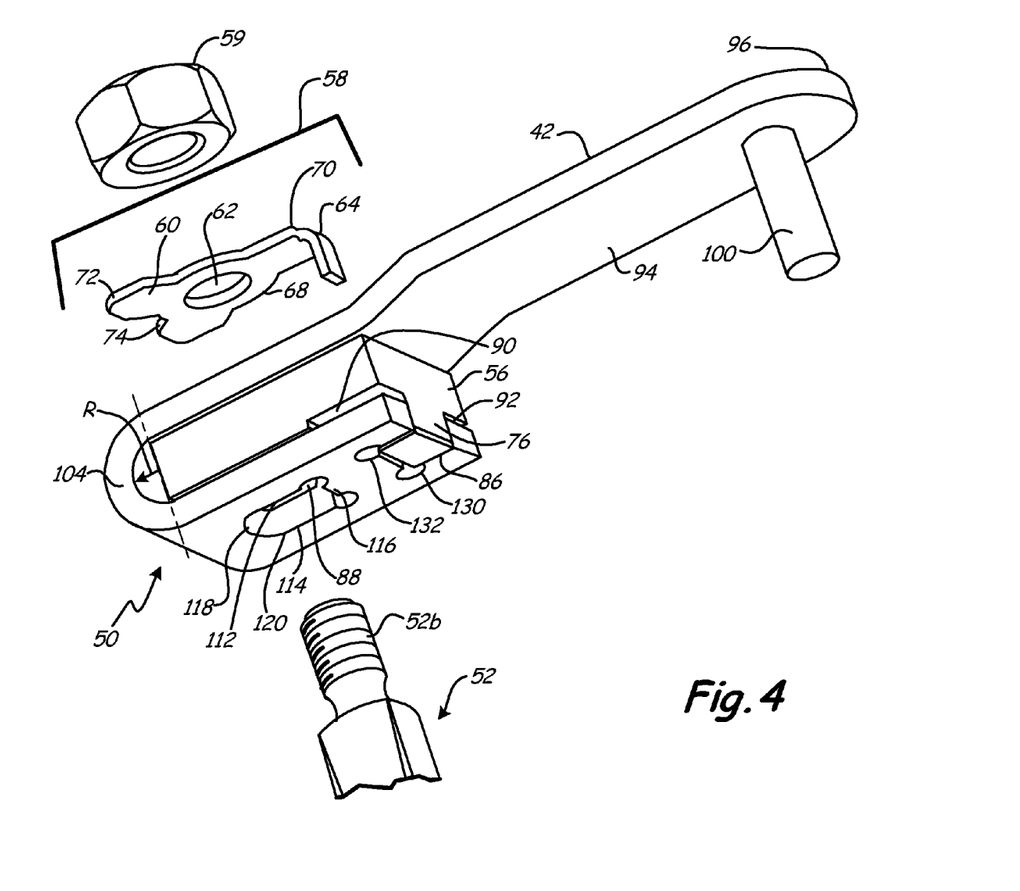
FIG. 4 shows a perspective view of the variable vane assembly of FIG. 3 with a vane arm having a pin and spacer attached thereto.

FIG. 3 is a perspective view of the components of a vane arm assembly 50 for connecting to outer trunnion 52 of vane 32. FIG. 4 shows a perspective view of variable vane arm assembly 50 of FIG. 3 with vane arm 42 having pin 100 and spacer 56 attached thereto. Vane arm assembly 50 is comprised of vane arm 42, spacer 56, locking mechanism 58, and fastener 59. Fastener 59 is a conventional threaded nut, such as a locking hex nut, that will thread onto threaded portion of trunnion 52 to secure vane assembly.

Figure 5:
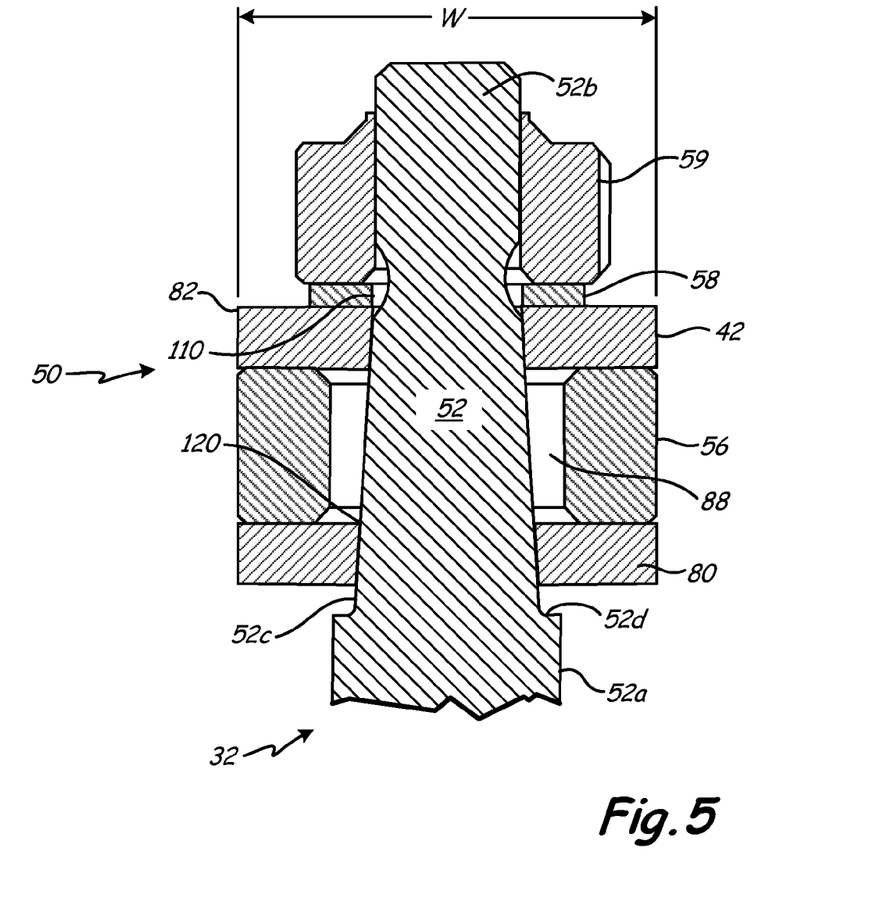
FIG. 5 shows a cross-sectional view of a variable vane arm assembly.

As illustrated in the cross-sectional view of vane arm assembly 50 in FIG. 5, trunnion 52 is the top outer stem portion of vane 32 (previously described), and contains cylindrical portion 52a and threaded portion 52b connected by joining portion 52c. Trunnion 52 is also commonly referred to as the outer stem of the vane. Joining portion 52c may be a tapered shank, and may contain a mistake proofing feature, such as a nonlinear side, to assure proper orientation of vane 32 (previously described) with respect to vane arm assembly 50. Trunnion 52 may contain a shelf 52d on cylindrical portion 52a, which may act as a stop for vane arm 42 in some embodiments.

Referring again to FIGS. 3 and 4, locking mechanism 58 secures spacer 56 in position with respect to vane arm 42. In the embodiment illustrated, locking mechanism 58 contains a generally planar portion 60 with an aperture 62, and tab 64. Locking mechanism 58 is constructed from a light weight metal, carbon graphite, composite, polymer, or similar materials. Tab 64 is a generally rectangular extension that is generally perpendicular to planar portion 60. Tab 64 is fabricated by bending a portion of a planar portion 60. In an alternate embodiment, tab 64 may be a small rod or strip of material secured to planer portion 60 such as by welding or a similar fusion process. Planer portion 60 is a washer with aperture 62 for the reception of the outer threaded portion 52B of trunnion 52 of vane 32. In the embodiment illustrated, planar portion 60 is comprised of circular portion 68, connecting portion 70, and locating members 72, 74. Circular portion 68 may be either centrally located or axially offset from center, and contains aperture 62 and acts as a flat or locking washer. Connecting portion 70 extends from circular portion 68 and provides the attachment surface for tab portion. Locating members 72, 74 extend from circular portion 68.

In the embodiment illustrated, two locating members 72, 74 extend at approximately ninety degrees from on another, and will extend past the perimeter of fastener 59 when vane assembly is assembled. Locating members 72, 74 may be designed to contain various surfaces to align or act as reference points with respect to other engine hardware and components. Alternately, locating member 72, 74 may be bent upward to prevent rotation of nut 59.

Spacer 56 is constructed from a light weight metal, carbon graphite, composites, or similar materials, and may be fabricated, such as by machining, from a larger piece of material. This helps reduce the overall weight of the vane arm assembly 50. Spacer has a rectangular prism shape with an extension 76 from one side. Spacer 56 is a precision piece that is designed to be placed between radially inner leg 80 and radially outer leg 82 of hook 84 of vane arm 42 that will provide support for hook 84 of vane arm 42, and attachment and guide means for other components of vane arm assembly 50. Spacer 56 provides compressive load support and a rigid stack so the tapered surfaces of vane arm 42 properly interface with trunnion 52.

In the embodiment illustrated, spacer 56 is of a length approximately equal that of the length of generally parallel surfaces of radially inner leg 80 and radially outer leg 82 of hook 84. Extension 76 is sized to mate with the cut-out 86 of vane arm extension, i.e., being of a length and depth that allows the surfaces of extension 76 to be generally flush with the area adjacent the surface cut-out 86 and linear surfaces of radially inner leg 80 and radially outer leg 82 of hook 84. Extension 76 is illustrated as a rectangular prism, although other geometries may be utilized. Various dimensions of spacer 56, including extension 76, may be oversized to allow for an interference fit with vane arm 42. In an alternate embodiment, a bonding agent may be used between spacer 56 and vane arm 42 to keep the parts in place with respect to one another after installation. An interference fit or bonding eliminates the need for additional components, such as fasteners, for assembling vane arm assembly 50.

Spacer 56 contains aperture 88 for the reception of outer threaded portion 6652b of trunnion 52 of vane 32. In the embodiment illustrated, the diameter of aperture 88 is equal to the largest cross-sectional dimension of trunnion 52. Aperture 88 extends through the body of spacer 56. In alternate embodiments, aperture 88 is of a cross sectional area that allows for insertion of trunnion stem joining portion 52c (See FIG. 5) through spacer 56 and vane arm 42. Aperture 88 may be oversized compared to the cross-sectional area of trunnion 52 to reduce weight of spacer 56.

Spacer 56 may have a portion of material removed adjacent extension 76 to form recesses 90, 92. The geometry of recesses 90, 92, including cross-sectional area and shape, may vary. Recesses 90, 92 provide a space for air flow, as well as reduce the weight of spacer 56. In certain designs, recesses 90, 92 are designed to permit adequate clearance between adjacent parts, which allows for proper assembly of vane arm assembly 50.

Vane arm 42 has hook 84 and actuation lever 94. Hook 84 is attached adjacent actuation lever 94, and both parts are fabricated from a singular piece of material such as a light weight, high tensile metal or alloy, or composite. In one embodiment, vane arm 42 and locking mechanism 58 are constructed from nickel or a nickel alloy. Vane arm 42 is constructed from standard sheet stock materials, thus reducing weight and cost.

Actuation lever 94 is comprised of a generally flat strip of material. End 96 opposite hook 84 is illustrated as rounded, but may be a different geometry such as square. Actuation lever 94 contains an aperture 98 adjacent end 96. Aperture 98 facilitates attachment of actuation lever 94 to synchronization ring 40A, 40B and thus the actuator for providing rotational movement of vane arm 42 (see FIG. 2). Any type of bolt, fastener, or linkage may be employed in this capacity with pin 100 being depicted to enable pivotal movement with the synchronization ring of the vane case.

Vane arm 42 may contain an angle or bend 102 to facilitate spacing and connection of vane arm assembly 50 with other adjacent engine components. Bend 102 positions actuation lever 94 with respect to hook 84. In the embodiment illustrated, bend 102 is between actuation lever 94 and hook 84, although in other embodiments bend 102 may be contained within actuation lever 94 of vane arm 42. Similarly, bend 102 is shown to be spacing actuation lever 94 radially outward of hook 84, but in other embodiments actuation lever 94 may be radially inward of the radially outward surface of hook 84. In yet another embodiment, vane arm 42 contains no angle or bend and actuation lever 94 is collinear with radially outer leg 82 of hook 84.

Hook 84 contains radially outer leg 82 joined to radially inner leg 80 through support 104. Support 104 is a semicircular or arcuate bend in vane arm 42, and positions radially outer leg 82 and radially inner leg 80 so that the two are generally parallel. Hook 84 is formed from a singular piece of material.

Axially outer end 106 of radially outer leg 82 opposite support 104 is connected to bend 102. Radially outer leg 82 contains aperture 108 adjacent bend. Aperture 108 receives tab 64 of locking mechanism 58 to secure locking mechanism 58 in place with respect to vane arm 42. Spacer 56 may also contain tab reception aperture (not illustrated), which provides a position for the insertion of tab 64 of locking mechanism 58 to locate vane arm assembly 50 components with respected to one another. The tab reception aperture of spacer 56 and aperture 108 are collinear about a radial axis, but need not be the same size or geometry in cross-section. Tab reception aperture need not extend through the entire body of spacer 56.

Radially outer leg 82 contains second aperture 110, which has two generally parallel sides 112, 114, linear side 116, and non-linear side 118. Apertures 110 and 120 are for the reception of trunnion 52 of vane 32. Non-linear side 118 acts as a fool-proofing mechanism during installation of vane arm assembly 50, assuring that vane 32 is properly set with respect to vane arm 42. In other embodiments, aperture 110 may contain other fool-proofing geometries, such as a trapezoidal opening. Aperture 110 is illustrated as being centrally located, but may be closer to support 104 than to bend 102.

Radially inner leg 80 contains aperture 120. Aperture 120 contains the same opening geometry and is collinear with aperture 110 in radially outer leg 82. This allows for the insertion of trunnion 52 of vane 32. In an alternate embodiment, a portion of trunnion is tapered, resulting in different cross-sectional areas of apertures 110, 120, and within each aperture 110 or 120 from its radially inner edge to its respective radially outer edge. Such a geometry assures full contact of the side surfaces of apertures 110, 120 with joining portion 52c (see FIG. 5). Such continuous contact eliminates wear-based backlash or hysteresis of the vane arm assembly 50.

Radially inner leg 80 also contains cut-out 86 for the reception of extension of spacer. As illustrated, cutout has three linear surfaces 124, 126, and 128 separated by arcs 130, 132. During fabrication, two holes are drilled through radially inner leg 80, and then linear surfaces 124, 126, 128 are fabricated. The presence of arcs 130, 132 allows for alignment of spacer 56, weight reduction of the part, and provides a fluid path for allowing air to contact and be directed by recesses 90, 92 of spacer 56.

Figure 6A:
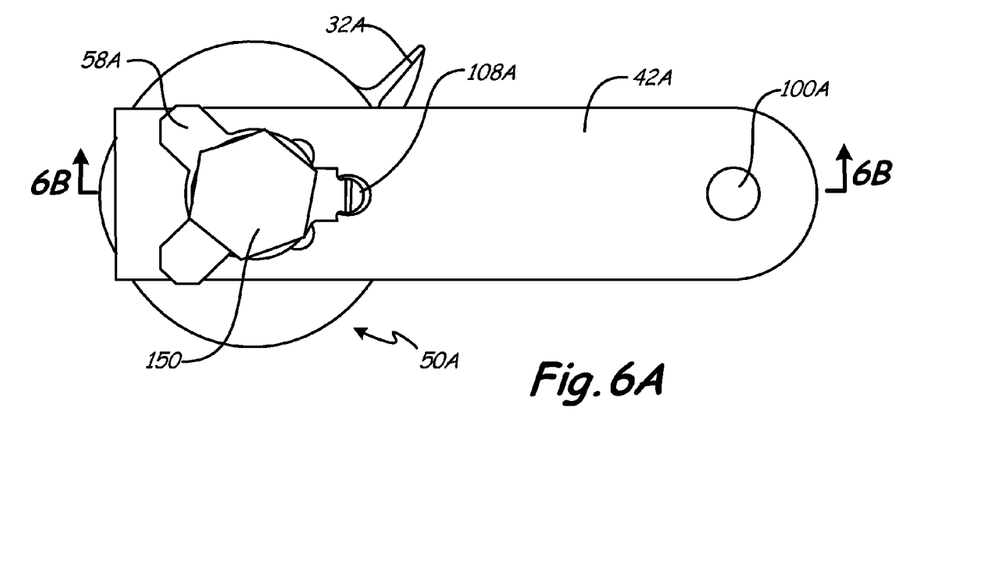
FIG. 6A shows a plan view of a variable vane arm assembly.
Figure 6B:
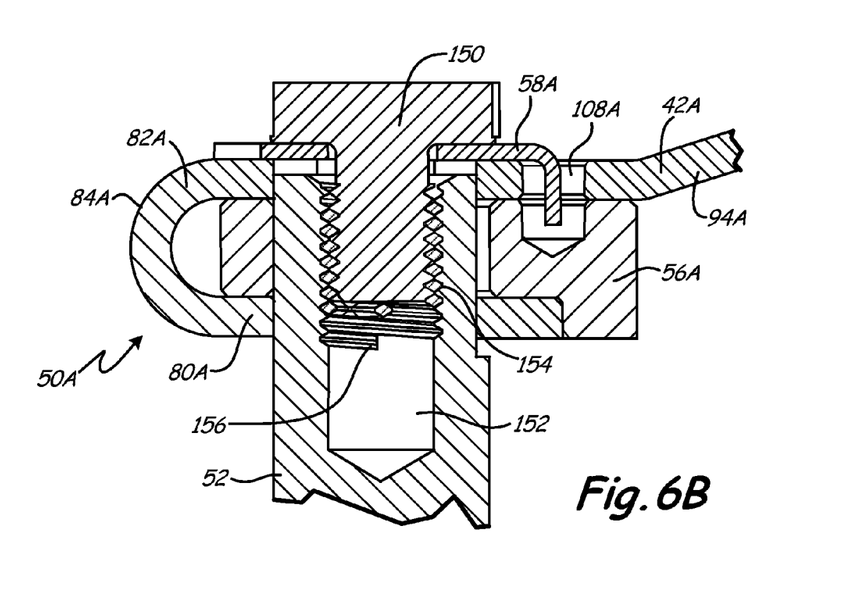
FIG. 6B shows a cross-sectional view of the variable vane arm assembly of FIG. 6A taken along line B-B.

FIG. 6A shows a plan view of a variable vane arm assembly. FIG. 6B shows a cross-sectional view of the variable vane arm assembly of FIG. 6A taken along line B-B. The variable vane arm assembly has vane arm assembly 50A connected to vane 32A. Vane arm assembly 50A includes vane arm 42A, spacer 56A, and locking mechanism 58A. Vane arm 42A has hook 84A joining radially outer leg 82A and radially inner leg 80A, and radially outer leg 82A is joined to actuation lever 94A. Actuation lever 94A contains pin 100A (see FIG. 4) for securing the assembly to enable pivotal movement with the synchronization ring of the vane case. Vane arm 42A also contains aperture 108A for the insertion of the tab of locking mechanism 58A. Spacer 56A may contain a coaxial aperture for the insertion of the tab.

In this embodiment, vane 32A contains a trunnion 52 with an aperture 152. The aperture 152 contains a threaded portion 154 for the reception of a corresponding threaded fastener 150. In addition, a thread locking insert 156 may be utilized to help secure fastener 150 in aperture 152. In an alternate embodiment, a thread locking compound may be applied prior to the insert of fastener 150 into the threaded aperture 152. Also, as illustrated in FIG. 6B, a gap may exist between the bottom of the head of fastener 150 and the top of trunnion 52. Locking mechanism is oversized compared to the aperture in vane arm 42A in which trunnion 52 is inserted, which will create a compressive force on vane arm 42A to position and hold vane arm 42A in place. Once the fastener is fully tightened, the radially inner surface of radially inner leg 80A will be secured to a landing created by a notch in trunnion 52. The notching of trunnion 52 also creates a fool-proofing mechanism that assures vane arm 42 is properly installed with respect to the other components of vane arm assembly 50A, including trunnion 52.

Figure 7:
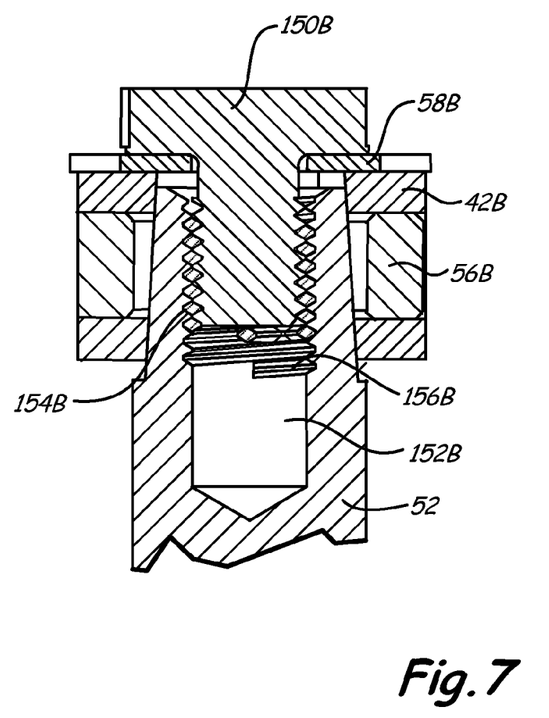
FIG. 7 shows a cross-sectional view of an alternate embodiment of a variable vane arm assembly.

FIG. 7 shows a cross-sectional view of an alternate embodiment of a variable vane arm assembly. In this embodiment, the vane arm assembly has vane arm 42B, spacer 56B, locking mechanism 58B, and fastener 150B. The assembly is secured to trunnion 52, which contains an aperture 152B with a threaded portion 154B for the reception of fastener 150B. Optionally, thread locking insert 156B is included to help secure fastener 150B with respect to trunnion 52B. As illustrated, in this embodiment, trunnion 52B is tapered, similar to that illustrated in FIG. 5.

The disclosed design of vane arm 42 greatly reduces manufacturing costs associated with the part. First, blanks are cut from sheet stock. Next, the blank is bent utilizing known bending methods, such as a break press. Vane arm 42 is designed so that hook 84 contains an inner radius R (see FIG. 4) that extends forward of actuation lever 94, and thus allows for the minimization of width W (see FIG. 5) of vane arm 42 without compromising structural integrity of the part. A narrower width W accommodates tight spatial constraints between adjacent vanes 32. Thus, adjacent vanes can be more closely spaced without fear of interference in operation from adjacent vanes. An engine can be retrofitted to contain more vanes per stage than in the original design.

The present embodiments of vane arm 42 create two shearing surfaces in contact with the trunnion. This provides a beneficial distribution of forces on the arm and trunnion compared to a solid vane arm design. The bend radius can be adjusted, which allows for a larger torsional shear area. Thus a larger radius results in a larger bite on the trunnion to distribute the force for adjusting the position of the vanes. In an embodiment for a tapered trunnion, the radius can be structurally optimized for shear capability of a required torque for a specific angle of taper. The disclosed embodiments allow for use on various types of vanes, including both tapered and straight, and internally and externally threaded.

The present design also provides numerous assurances that the components are secured with respect to one another. Locking mechanism 58 is flexible, and can provide a compressive force to prevent turning of nut 59 or fastener 150. Alternately, locating members 72, 74 may be bent upward to prevent rotation of nut 59. Similarly, the hook in vane arm 42 can be slightly oversized so that when the arm is secured, there is a compressive force between the radially inner leg 80 and radially outer leg 82 that acts to hold nut 59 or fastener 150 in place. As another added precaution, nut 59 may be a locking nut, thread locking insert 156 is provided between male and female threads, or a thread locking compound is applied to the threaded areas of vane arm assembly 50 prior to assembly of the components.

Figure 8:
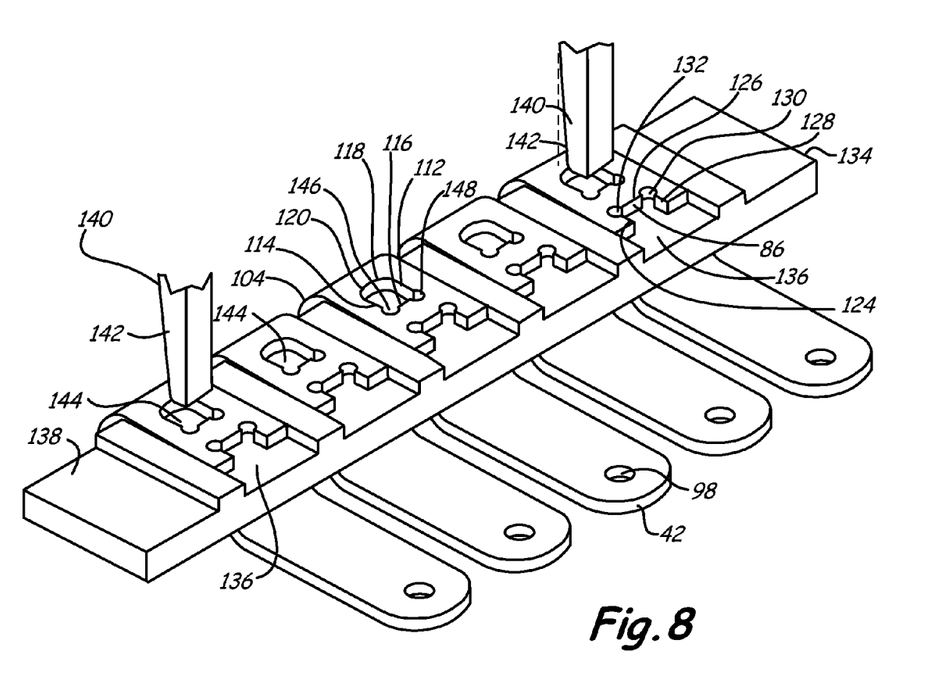
FIG. 8 shows a perspective view of a fixture and tooling for manufacturing vane arms.

FIG. 8 illustrates fixture 134 supporting several vane arms 42. Fixture 134 contains a series of slots 136 on top side 138 to receive the radially inner leg and position vane arm 42 within fixture 134. Fixture 134 is designed to allow vane arm 42 to slide over until contacting support 104 of vane arm 42. In the embodiment illustrated, apertures are formed within stem support with an EDM (electro-discharge machine) tool 140. Tool 140 is shaped to create an aperture that allows for the foolproofing shape previously discussed. Similarly, tool 140 may be provided with a taper 142, profiling that of the trunnion 52 of vane 32 as illustrated in FIG. 5.

Fixture 134 may contain aperture 144 corresponding to apertures 110, 120 (see FIG. 3), and thus tool 140 is used to create apertures in vane arm 42. In an alternate embodiment, fixture 134 is disposable tooling and the EDM tooling cuts an aperture 144 through fixture as well as radially inner leg 80 and radially outer leg 82 of vane arm 42. In this embodiment, vane arm 42 is first cut from a base piece of material. The arm is then bent, and positioned on fixture 134, and apertures 110, 120, and 98 and other associated features (cut-out 86) are cut. Apertures 110, 120 are started by drilling circular holes 146, 148 to create a discharge path for debris from tool 140. Tool 140 then cuts aperture 110, including two generally parallel sides 112, 114, linear side 116, and non-linear side 118. Similarly, tool 140 will then cut aperture 120 in radially outer leg 82.

In an alternate embodiment, vane arm 42 is cut from a piece of material. Apertures 98 and 108 are then drilled. Cut-out 86 is then fabricated by first drilling two holes that will create arcs 130, 132, and then removing material leaving linear surfaces 124, 126, 128, such as by machining. After completion of these features, vane arm 42 is bent to create support 104, and also bend 102.

In an alternate embodiment, vane arm 42 and corresponding 110, 120, 108, and 98 apertures are formed prior to bending of vane arm 42, such as by stamping, laser or plasma cutting, or drilling and machining of the flat pattern into a sheet of material. Vane arm 42 is then bent to create hook 84, and optionally bend 102. Care should be taken in the bending process to assure that apertures 110, 120 in the radially inner leg 80 and radially outer leg 82 of vane arm 42 align after the flat pattern is bent. In yet another embodiment, a combination of machining and drilling is done both prior to and after bending.

After fabrication, vane arm 42 and associated vane arm assembly components may be installed into engine 10. Spacer 56 is placed in hook 84. Locking mechanism 58 is then placed on the radially outer surface of hook 84. Apertures 110, 120 of hook 84, aperture 88 in spacer 56, and aperture 62 in locking mechanism 58 are aligned to be collinear about a radially extending axis. In some embodiments, extension 76 of spacer 56 is secured to cut-out 86 in vane arm 42 through an interference fit. Further, in some embodiments, tab 64 of locking mechanism 58 extends into aperture 108 of vane arm 42, and optionally into an aperture in spacer 56. This locates and further secures vane arm 42, spacer 56, and locking mechanism 58 with respect to each other. Trunnion 52 is then inserted into this sub-assembly, and is secured to vane arm assembly 50 via fastener 59. Next, actuation lever 94 is positioned so that pin 100 may be inserted into aperture 98 to connect vane arm assembly 50 to synchronization rings 40A and 40B.

The disclosed design of a vane arm and vane arm assembly has several advantages. The fabrication of the vane arm utilizes existing machinery without requiring expensive tooling, thus reducing costs. Similarly, fabricating the vane arm from stock material, such as cutting blanks from sheets, saves on material costs over existing designs.

The design of the vane arm assembly allows for several different ways of reducing weight of the components (vane arm, spacer, and locking mechanism) without sacrificing structural integrity. This is important because added weight to an engine reduces the efficiency of the engine and any corresponding machine (i.e., aircraft) by requiring greater fuel consumption. The design of the hook with a small radius reduces the size of the vane assembly. In this design of the vane arm, the hook doubles the contact surface area within the same width of a comparable arm without the hook. This allows for closer spacing of the vane arms within a given diameter within the engine. Further, the spacer with the hook of the vane arm adds strength, which allows for a narrower vane arm. This prevents interference with adjacent parts, and also can be translated into additional vanes for the engine stage if desired. Although the vane arm may contain a smaller area adjacent the trunnion than existing vane arms, this can be compensated by placing a bend in the vane arm. This assures that the vane arm is still capable of being connected to both the vane and the synchronization ring, and thus allows for retrofitting on existing engines.

Although the present invention has been described with reference to preferred embodiments, workers skilled in the art will recognize that changes may be made in form and detail without departing from the spirit and scope of the invention.

The invention claimed is:

1. A vane arm assembly comprising: a vane arm comprising a hook portion formed of one piece of material, with a first end, a second end, and a center portion, the second end opposite the first end; a section of the center portion formed into an arcuate shape such that the first end and the second end are pointed in the same general direction and generally parallel, with the first end extending farther than the second end so that the first end can be used as an actuation lever; the first end comprising a radially outer leg and the second end comprising a radially inner leg; a first aperture at the first end for the reception of a first fastener to connect the first end to an actuation mechanism; a spacer capable of being inserted into the hook portion of the vane arm; a locking mechanism attached to the radially outer side of the hook portion; and a second fastener for securing the assembly to an outer trunnion of a vane.

2. The vane arm assembly of claim 1 wherein the locking mechanism contains a radially extending tab.

3. The vane arm assembly of claim 2 wherein the tab extends through a second aperture in the radially outer leg of the hook portion.

4. The vane arm assembly of claim 3 wherein the tab extends into a third aperture in the spacer.

5. The vane arm assembly of claim 1 wherein the hook portion contains a cut out adjacent a first edge of the radially inner leg.

6. The vane arm assembly of claim 5 wherein the spacer contains an extension that mates with the cut out for locating the spacer with respect to the vane arm.

7. The vane arm assembly of claim 6 wherein the cutout and extension have an interference fit.

8. The vane arm assembly of claim 1 wherein the radially inner leg, spacer, radially outer leg, and locking mechanism each contain a fourth, fifth, sixth, and seventh aperture, respectively, and the fourth, fifth, sixth, and seventh apertures are all collinear about a radially extending axis.

9. A gas turbine engine comprising: a compressor section; a combustion section; and a turbine section; wherein the compressor section contains a plurality of vanes connected to a plurality of vane arms, the vane arms comprising a hook portion formed of one piece of material, with a first end, a second end, and a center portion, the second end opposite the first end; a section of the center portion formed into an arcuate shape such that the first end and the second end are pointed in the same general direction and generally parallel, with the first end extending farther than the second end so that the first end can be used as an actuation lever; the first end comprising a radially outer leg and the second end comprising a radially inner leg; a first aperture at the first end for the reception of a first fastener to connect the first end to an actuation mechanism; a spacer capable of being inserted into the hook portion of the vane arm; a locking mechanism attached to the radially outer leg of the hook portion; and a second fastener for securing the assembly to an outer trunnion of a vane; wherein the hook portion of each vane arm attaches to an outer trunnion of one of the plurality of vanes.

\* \* \* \* \*

UNITED STATES PATENT AND TRADEMARK OFFICE
CERTIFICATE OF CORRECTION

PATENT NO. : 8,215,902 B2  
APPLICATION NO. : 12/251560  
DATED : July 10, 2012  
INVENTOR(S) : Daniel W. Major and Bernard W. Pudvah Page 1 of 1

It is certified that error appears in the above-identified patent and that said Letters Patent is hereby corrected as shown below:

Col. 6, Line 38
  Delete "6652b"
  Insert --52b--

Signed and Sealed this
Ninth Day of October, 2012

David J. Kappos
*Director of the United States Patent and Trademark Office*